Dec. 24, 1929.  G. T. GIBSON  1,740,730
ELECTRICAL SERVICE AND METER CABINET
Filed Feb. 26, 1927  2 Sheets-Sheet 1

Inventor
GEO. T. GIBSON
By Earl M. Sinclair
Attorney

Dec. 24, 1929.  G. T. GIBSON  1,740,730
ELECTRICAL SERVICE AND METER CABINET
Filed Feb. 26, 1927  2 Sheets-Sheet 2

Inventor
GEO. T. GIBSON
By Earl M. Sinclair
Attorney

Patented Dec. 24, 1929

1,740,730

UNITED STATES PATENT OFFICE

GEORGE T. GIBSON, OF DES MOINES, IOWA

ELECTRICAL SERVICE AND METER CABINET

Application filed February 26, 1927. Serial No. 171,203.

The principal object of this invention is to provide an improved and convenient construction and arrangement of parts for the electrical connections, fuse sockets, line switch, and meter governing the electrical service to a house or other building.

A further object of the invention is to provide an improved cabinet adapted to contain all the terminals, fuse sockets, line switch, and the meter relating to the electrical service for a building and so arranged that the meter may be read from the exterior of the building and be sealed in the cabinet so as to be accessible only to employees of the service company.

A further object is to provide an arrangement of the members of an electrical service system so as to produce a higher degree of electrical protection and insulation of the parts and also to simplify and facilitate the operation of installation in a building and to insure proper installation.

With these and other objects in view, my invention consists in the construction, arrangement and combination of elements hereinafter set forth, pointed out in the claims and indicated by the accompanying drawing in which—

Figure 1:
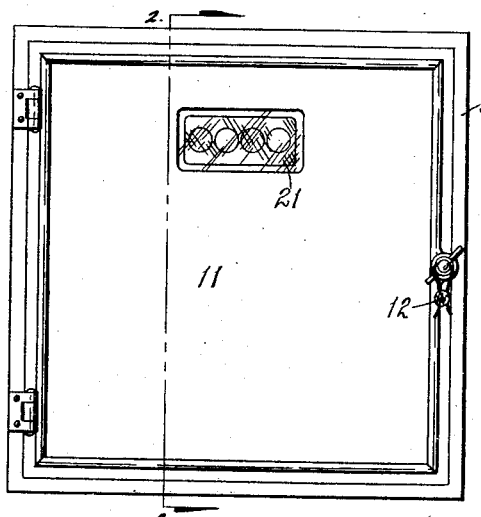
Fig. 1 is an exterior view of the cabinet.
Figure 2:
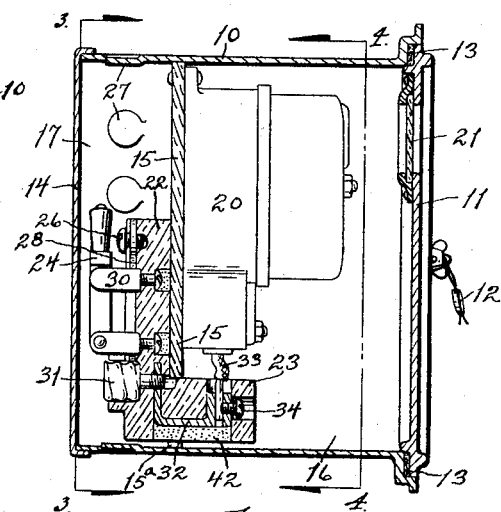
Fig. 2 is a vertical section on the line 2—2 of Fig. 1.
Figure 3:
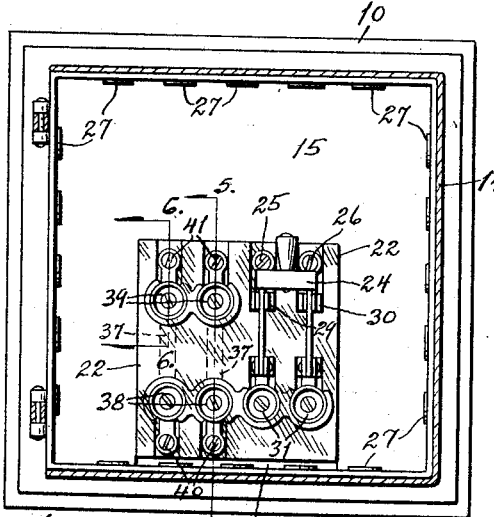
Fig. 3 is a vertical section on the line 3—3 of Fig. 2 and showing particularly those elements which are accessible from the interior of the building.
Figure 4:
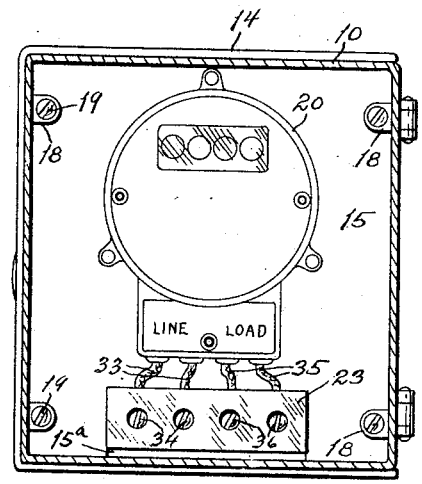
Fig. 4 is a vertical section on the line 4—4 of Fig. 2 and showing particularly those elements which are accessible only from the exterior of the building and protected by a sealed door.
Figure 5:
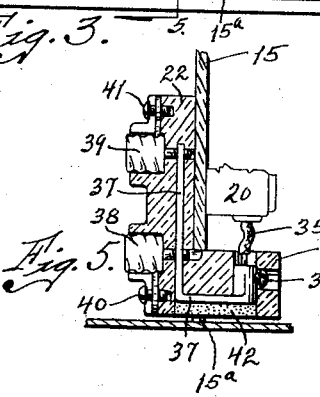
Fig. 5 is a detail section on the line 5—5 of Fig. 3 showing particularly the method of making the electrical connections to the fuse sockets.
Figure 6:
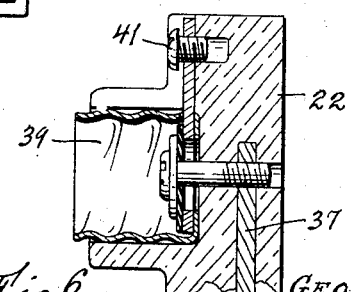
Fig. 6 is a detail section on the line 6—6 of Fig. 3 showing the method of mounting one of the fuse sockets.

In the construction of the device as shown in Figs. 1 to 6 inclusive, a metal cabinet 10 is employed which is designed to be mounted in the foundation wall of a residence or other building to be served electrically and the outer end of said cabinet is provided with a hinged door 11 adapted to be latched and permanently sealed by a sealing device 12 which is supposed to be under the control of the service company. The outer entrance to the cabinet may be made of water-tight construction by providing a gasket 13 behind the door 11. The inner end of the cabinet 10 is closed by a hinged door 14 which may be opened and closed at the will of the occupant of the building for access to certain elements of the service connection such as the line switch and the fuse plugs. The electrical connections may be mounted in any suitable manner within the cabinet 10 but I prefer to mount them on a partition such as 15 of suitable insulating material which is removably mounted in the cabinet and extends across the same in a plane parallel with the doors 11 and 14 and spaced from both of such doors so as to form an outer compartment 16 and an inner compartment 17 in the cabinet which compartments are closed by the doors 11 and 14 respectively. By this arrangement all of the service connections including the meter may be mounted on and carried by the partition 15 and the elements may be so arranged that some of the connections are accessible only by opening the inner door 14 and others are accessible only by opening the outer door 11. This arrangement also makes it possible to mount the housing or cabinet 10 in the foundation wall during the construction of the building and to install the connections at a later date, that is to say when the building is nearly ready for occupancy, simply by inserting the partition 15 and mounting the connections on said partition either before or after its installation. The partition 15 may be mounted against ears 18 struck inwardly from the walls of the housing 10 and be secured thereto as by means of screws or bolts 19.

In the present embodiment of the invention the electrical meter which I have designated by the numeral 20 is mounted on the outer face of the partition 15 near the top of said partition and the outer door 11 is provided with a glazed window 21 through which the dials of the meter may be read from the exterior of the building. This is a great convenience both to the employees of the service company and to the occupants of the building. A block or base 22 of insulating material is mounted against the inner face of the partition 15 and suitably secured thereto and said block is formed at its lower end with a projection 23 which extends through a notch 15ª formed in the lower end of said partition. The block 22 and its extension 23 are designed to carry substantially all of the members included in the electrical connections for bringing the service wires into the building, passing them through the meter 20 and connecting them through suitable fuses to one or more circuits in the building. The line switch may be of any suitable type and is here shown as being an ordinary knife switch with two blades and designated generally by the numeral 24. Binding posts 25 and 26 are provided on the insulating base 22 and are designed to receive connection of service wires (not shown) which may be brought into the compartment 17 of the cabinet from any desired direction. To facilitate the passage of conductors to and from the cabinet, I prefer to provide the wall of the cabinet with a number of "knockouts" 27 in each of the walls of the cabinet so that apertures may readily be formed at the desired locations for any particular installation. The binding posts 25 and 26 are suitably connected by connectors 28 with the respective spring forks 29 and 30 which are designed to cooperate with the blades of the switch 24. A number of fuse sockets 31, in this instance two in number, are arranged on the insulating base 22 adjacent the legs of the switch 24 and electrically connected therewith, said sockets being designed to receive the usual fuse plugs (not shown). The extension 23 of the insulating base constitutes a meter terminal plate and U-shaped connectors 32 are mounted in said base and its extension and each has one end connected with one of the fuse sockets 31 and the opposite end apertured to receive a wire such as 33, anchored by a screw 34, said wires leading to the meter 20 and serving to carry the current thereto when the circuit is completed. Other wires 35 lead from the opposite side of the meter 20 back to the terminal plate or extension 23 and are anchored by means of screws 36 in other U-shaped connectors 37 (see Fig. 5), which are embedded in said extension and the base 22 and extend upwardly in said base parallel with the connectors 32. Suitably mounted on the base 22 and electrically associated with the connectors 37 are a number of pairs of fuse sockets, one pair for each of the circuits to be provided for the building, in this instance two in number and the sockets being designated by the numerals 38 and 39. The sockets 38 and 39 are designed to receive the usual replaceable fuse plugs (not shown). Electrically associated with the fuse sockets 38 and 39 respectively are the binding posts 40 and 41 which are designed to receive connection of the conductors (not shown) comprising portions of the respective circuits for the building in which the installation is made. It will be noted that the base plate 22 and its extension 23 which comprises the meter terminal plate form a unitary structure which supports all of the terminal posts, fuse sockets, and switch members for establishing connections from the service lines through the meter and to the respective circuits of the building; that all of these members may be assembled to the base and its extension before the time for the installation and that when the installation is made, the connectors are entirely covered, sealed, and protected by the base plate 22, extension 23, and insulating partition 15. In the present construction, I have shown the connectors 32 and 37 as mounted from below in suitable recesses formed in the base 22 and its extension and then covered by a suitable plastic or cement such as indicated by the numeral 42 in Figs. 2 and 5. In other words, the arrangement and mounting of the members referred to is a factory job and nothing is left to the discretion or skill of the workman charged with the duty of making the particular installation. There is no chance of his making the wrong connections to the meter because the terminal plate 23 is necessarily mounted directly below the meter and the connectors 32 and 37 are arranged substantially below the points with which they are to be electrically connected to the meter. This method of assembling all of these parts ready for the installation insures a proper and correct installation in the least possible time and avoids mistakes which are often troublesome to the contractor, householder, service company, and everyone else interested in the installation. This arrangement also insures a high degree of electrical protection because the connectors are all protected and insulated by their peculiar arrangement in and relative to the base and extension.

It will be noted that the householder or other person in charge of the building can have access at any time to the interior compartment 17 of the cabinet for replacing burnt out fuses or for disconnecting the switch 24 for any legitimate purpose. Also that the meter and its direct connections through the terminal plate 24 are fully inclosed and accessible only to the agents or employees of the service company for legitimate purposes by removing the seal 12 and opening the door 11, except that the meter may be read from the exterior of the building at any time without disturbing the occupants of the building or waiting upon their pleasure for admission thereto.

Figures 7, 8:
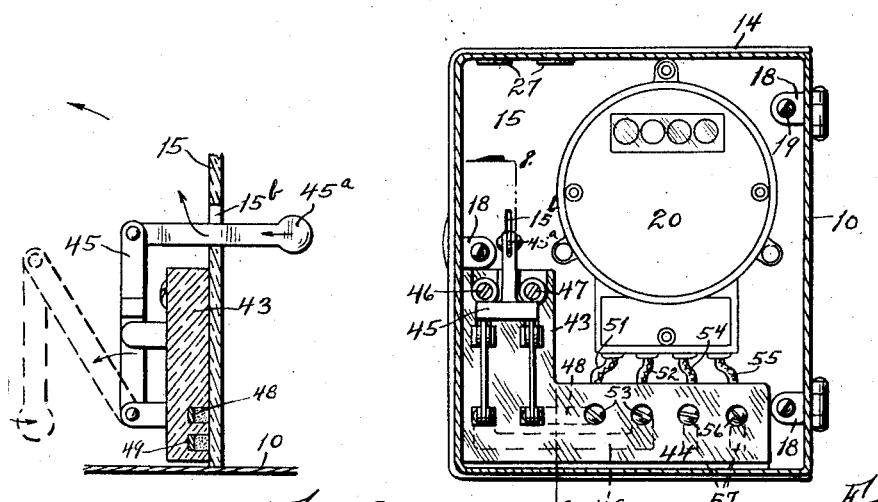
Fig. 7 is a vertical section of a modified form of cabinet in which an additional feature is involved including the ability to place the line switch in such condition that it cannot be operated from the interior of the building.
Fig. 8 is a detail section on the line 8—8 of Fig. 7 showing a form of switch which may be employed in this construction.

In the embodiment or modification shown in Figs. 7 and 8, all of the features previously referred to are utilized and in addition there is the added function of exclusive control of the line switch from the exterior compartment of the cabinet at the option of the service company. In this construction an insulating base 43 is mounted on the outer face of the partition 15 at one side of the meter 20 and said base has at its lower end a rightangled extension 44 which comprises the meter terminal plate. The switch 45 is mounted on the base 43 and has connections through the binding posts 46 and 47 with the service lines leading into the cabinet. The connectors 48 and 49 (dotted lines Fig. 7) lead laterally from the legs of the switch 45 to the terminal plate 44 and are connected with the wires 51 and 52 which lead into the meter, said wires being anchored to the connectors by the screws 53. The wires 54 and 55 which lead out of the meter are anchored by screws 56 to the conductors 57, which lead to the opposite side of the partition 15 and are electrically associated with suitably mounted fuse sockets (not shown) and other members accessible from the interior of the building for completing the circuits in a meter similar to that previously described. Pivotally connected to the handle of the switch 45 is a rod 45$^a$ which extends loosely through a slot 15$^b$ in the partition 15 and is ordinarily operable from the interior of the building so that the switch may be opened or closed at the will of the occupants of the building. In the event the service company desires to discontinue service, the operating rod 45$^a$ may be withdrawn through the slot 15$^b$ to the position indicated by dotted lines in Fig. 8 and thereafter, with the switch in open position as indicated, no current can be had in the building until proper arrangements are made and the switch has been closed by action of agents or employees of the company. The operating rod 45$^a$ is then replaced through the slot 15$^b$ so that the switch thereafter can be manipulated from the interior of the building.

Figure 9:
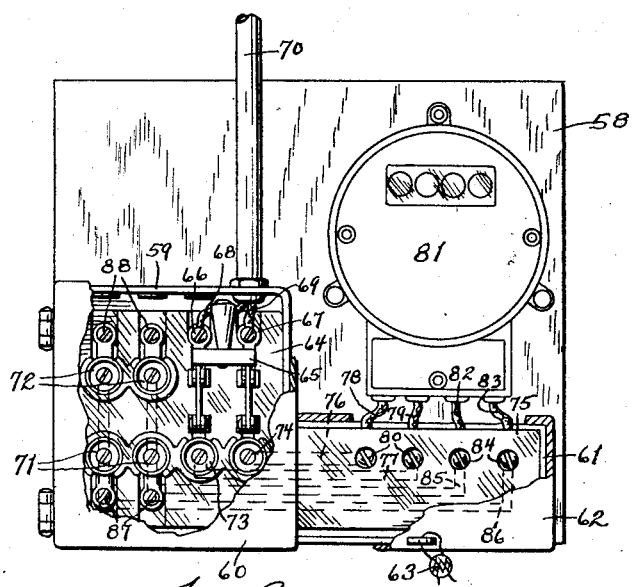
Fig. 9 is an interior view partly in section illustrating a further modified form in which the meter is not included in the cabinet and is not accessible from the exterior of the building.

In the modification or embodiment illustrated in Fig. 9, the accessibility of the meter from the exterior of the building is omitted but the unitary assembly of the electrical connections is retained and embodied in this construction. I have used the numeral 58 to designate a baseboard which is mounted in any suitable location within the building to be served and on which is arranged a cabinet 59 closable by a hinged door 60. The cabinet 59 is formed with an extension cabinet 61 closable by a door 62 provided with a sealing device 63 so that access to the extension cabinet 61 is under the control of the service company. In the main cabinet 59 is an insulating plate 64 on which is mounted a switch 65 and binding posts 66 and 67. To the posts 66 and 67 are connected service wires 68 and 69 which enter the cabinet through a conduit 70. The insulating base 64 also carries a number of pairs of fuse sockets 71 and 72 relating to the circuits to be employed in the building and also a pair of fuse sockets 73 and 74 having electrical connections with the legs of the switch 65. The insulating base 64 is provided with a lateral extension 75 which projects within the extension cabinet 61 and constitutes the meter terminal plate. Connectors 76 and 77 are electrically associated with the fuse sockets 73 and 74 and lead laterally in the insulating base 64 and its extension 75 where they have electrical connection with wires 78 and 79 to which they are anchored by means of screws 80. The wires 78 and 79 lead into the meter 81 which is mounted on the board 58 directly above the cabinet extension 61. Other wires 82 and 83 lead out of the meter into the terminal plate 75 and are anchored by screws 84 to connectors 85 and 86 which lead downwardly and then laterally in the terminal plate 75 and insulating plate 64 and then upwardly in the latter member where they are electrically associated with the fuse sockets 71 and 72. Terminal screws 87 and 88 are associated with the fuse sockets 71 and 72 to receive connection of the circuit wires for serving the building. This modification has the advantage of the assembly of switch, fuse sockets, and terminals in a single unit which may be readily and easily installed without danger of making wrong connections and also embodies the feature of a high degree of electrical protection.

It is obvious that various changes may be made in the form, construction, and arrangement of elements within the scope of the appended claims without departing from my invention.

I claim as my invention:

1. A structure of the class described, comprising a cabinet mounted in and extending through a wall, a partition dividing said cabinet into inner and outer compartments accessible respectively from the interior and the exterior of a building, an insulating plate mounted on said partition in the inner compartment and having an extension projecting through said partition and into the outer compartment of the cabinet and constituting a meter terminal plate, a line switch carried by said plate within the inner compartment, means for connecting service wires to said switch, fuse sockets carried by said plate and electrically connected with said switch, connectors mounted in said plate and its extension and connected at one end with said fuse sockets, a meter mounted on said partition in said outer compartment and above said terminal plate, conductors extending from said connectors into the meter, other conductors extending from the meter back to said terminal plate, circuit fuse sockets carried by said insulating plate, and connectors connecting the last named conductors to said circuit fuse sockets.

2. A structure of the class described, comprising a housing adapted to be mounted in and extending through the wall of a building, a partition dividing said housing into an outer compartment and an inner compartment, separate doors for closing the outer and inner compartments and located on opposite sides of the building wall, an insulating plate mounted in the inner compartment of said housing and provided with an extension projecting through said partition and into the outer compartment of the housing and constituting a meter terminal plate, a meter mounted in the outer compartment directly above said terminal plate, and electrical connections carried entirely by said insulating plate and terminal plate for carrying electric current from service wires through said meter to circuit wires.

3. A structure of the class described, comprising a housing adapted to be mounted in and extending through the wall of a building, a partition dividing said housing into an outer compartment and an inner compartment, separate doors for closing the outer and the inner compartments and located on opposite sides of the building wall, an insulating plate mounted in the inner compartment of said housing and provided with an extension projecting through said partition and into the outer compartment of the housing and constituting a meter terminal plate, a meter mounted in the outer compartment directly above said terminal plate, electrical connections carried entirely by said insulating plate and terminal plate for carrying electric current from service wires through said meter to circuit wires, and the outer door of said housing being provided with a transparent window through which said meter may be read from the exterior of the building, together with means for sealing said outer door.

4. A structure of the class described, comprising a housing adapted to be mounted in and extending through the wall of a building, a partition dividing said housing into an inner and an outer compartment, separate doors for closing the inner and outer compartments located at opposite sides of the building wall, an insulating base mounted in the inner compartment and having an extension projecting through said partition and into the outer compartment and constituting a meter terminal plate, an electric meter mounted in the outer compartment directly above said terminal plate and electrically connected therewith, circuit fuse sockets carried by said insulating plate and having electrical connections through said insulating plate and terminal plate with the meter, a switch carried by the insulating plate and having electrical connections through said plate and the terminal plate with said meter, a means carried by said insulating plate for connecting service wires to said switch, said switch and fuse sockets being accessible only by the door controlling the inner compartment, and the meter and its connections being accessible only by the door controlling the outer compartment.

5. A structure of the class described, comprising a housing, a partition extending across said housing, a meter mounted on one side of said partition, an insulating plate mounted on the opposite side of said partition, a line switch carried by said plate, means for connecting service wires to said switch, fuse sockets carried by said plate and electrically connected with said switch, said plate being formed with an extension projecting through said partition below the meter, substantially U-shaped connectors embedded in said plate and its extension and connected with said fuse sockets, conductors extending from said connectors into the meter, other conductors extending from the meter back to said extension, circuit fuse sockets carried by said insulating plate, and other substantially U-shaped connectors embedded in said plate and its extension and connecting the last named conductors to said circuit fuse sockets.

GEORGE T. GIBSON.